(12) United States Patent
Yadav et al.

(10) Patent No.: US 8,281,793 B2
(45) Date of Patent: Oct. 9, 2012

(54) FORMATION AND DEPOSITION OF SPUTTERED NANOSCALE PARTICLES IN CIGARETTE MANUFACTURE

(75) Inventors: Ramkuber Yadav, Richmond, VA (US); Khaled Saoud, Richmond, VA (US); Firooz Rasouli, Midlothian, VA (US); Mohammad Hajaligol, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 13/240,238

(22) Filed: Sep. 22, 2011

(65) Prior Publication Data

US 2012/0012122 A1 Jan. 19, 2012

Related U.S. Application Data

(62) Division of application No. 10/972,205, filed on Oct. 25, 2004, now Pat. No. 8,051,859.

(60) Provisional application No. 60/514,553, filed on Oct. 27, 2003.

(51) Int. Cl.
 *A24B 15/18* (2006.01)
(52) U.S. Cl. ............... 131/334; 131/352; 131/309
(58) Field of Classification Search .................. None
 See application file for complete search history.

(56) References Cited

U.S. PATENT DOCUMENTS

| | | |
|---|---|---|
| 3,720,214 A | 3/1973 | Norman et al. |
| 3,807,416 A | 4/1974 | Hedge et al. |
| 4,193,412 A | 3/1980 | Heim et al. |
| 4,317,460 A | 3/1982 | Dale et al. |
| RE31,700 E | 10/1984 | Yamaguchi |
| 4,956,330 A | 9/1990 | Elliott et al. |
| 5,040,551 A | 8/1991 | Schlatter et al. |
| 5,050,621 A | 9/1991 | Creighton et al. |
| 5,158,933 A | 10/1992 | Holtz et al. |
| 5,211,684 A | 5/1993 | Shannon et al. |
| 5,258,340 A | 11/1993 | Augustine et al. |
| 5,322,075 A | 6/1994 | Deevi et al. |
| 5,446,003 A | 8/1995 | Augustine et al. |
| 5,591,368 A | 1/1997 | Fleischhauer et al. |
| 5,766,562 A | 6/1998 | Chattha et al. |
| 5,934,289 A | 8/1999 | Watkins et al. |
| 6,053,176 A | 4/2000 | Adams et al. |
| 6,083,467 A | 7/2000 | Takeshima et al. |
| 6,121,191 A | 9/2000 | Komatsu et al. |

(Continued)

FOREIGN PATENT DOCUMENTS

CH 609217 2/1979

(Continued)

OTHER PUBLICATIONS

Ganqvist, et al., "Ultrafine metal particles", Journal of Applied Physics, vol. 47, No. 5, May 1976, American Institute of Physics, pp. 2200-2219.

*Primary Examiner* — Michael J Felton
(74) *Attorney, Agent, or Firm* — Buchanan Ingersoll & Rooney PC

(57) ABSTRACT

Nanoscale particles are formed and deposited in situ on tobacco cut filler, cigarette paper and/or cigarette filter materials by physical vapor deposition. The nanoscale particles are capable of acting as an oxidant for the conversion of carbon monoxide to carbon dioxide and/or as a catalyst for the conversion of carbon monoxide to carbon dioxide.

32 Claims, 1 Drawing Sheet

| U.S. PATENT DOCUMENTS | | | |
|---|---|---|---|
| 6,265,341 B1 | 7/2001 | Komatsu et al. | |
| 6,276,132 B1 | 8/2001 | Kanesaka et al. | |
| 6,365,545 B1 | 4/2002 | Komatsu et al. | |
| 6,409,851 B1 | 6/2002 | Sethuram et al. | |
| 6,769,437 B2 | 8/2004 | Hajaligol et al. | |
| 6,782,892 B2 | 8/2004 | Li et al. | |
| 6,857,431 B2 | 2/2005 | Deevi et al. | |
| 7,004,993 B2 | 2/2006 | Pithawalla et al. | |
| 7,011,096 B2 | 3/2006 | Li et al. | |
| 7,152,609 B2 | 12/2006 | Li et al. | |
| 7,165,553 B2 | 1/2007 | Luan et al. | |
| 7,168,431 B2 | 1/2007 | Li et al. | |
| 7,228,862 B2 | 6/2007 | Hajaligol et al. | |
| 7,243,658 B2 | 7/2007 | Deevi et al. | |
| 7,491,675 B2 | 2/2009 | Deevi et al. | |
| 7,509,961 B2 | 3/2009 | Saoud et al. | |
| 7,560,410 B2 | 7/2009 | Pillai et al. | |
| 7,569,510 B2 | 8/2009 | Deevi et al. | |
| 7,622,421 B2 | 11/2009 | Deevi et al. | |
| 7,640,936 B2 | 1/2010 | Rabiei et al. | |
| 7,677,254 B2 | 3/2010 | Reddy et al. | |
| 7,712,471 B2 | 5/2010 | Reddy et al. | |
| 7,743,772 B2 | 6/2010 | Sundar et al. | |
| 7,744,846 B2 | 6/2010 | Deevi et al. | |
| 7,879,128 B2 | 2/2011 | El-Shall et al. | |
| 7,934,510 B2 | 5/2011 | Gedevanishvili et al. | |
| 7,950,400 B2 | 5/2011 | Rabiei et al. | |
| 7,997,281 B2 | 8/2011 | Reddy et al. | |
| 8,006,703 B2 | 8/2011 | Deevi et al. | |
| 8,011,374 B2 | 9/2011 | Rabiei et al. | |
| 8,020,567 B2 | 9/2011 | El-Shall et al. | |
| 2004/0250827 A1 | 12/2004 | Deevi et al. | |
| 2005/0051185 A1 | 3/2005 | Rasouli et al. | |
| 2005/0155616 A1 | 7/2005 | Rasouli et al. | |
| 2007/0095358 A1 | 5/2007 | Li et al. | |
| 2007/0113862 A1 | 5/2007 | Li et al. | |
| 2007/0163612 A1 | 7/2007 | Miser et al. | |
| 2007/0246054 A1 | 10/2007 | Gedevanishvili et al. | |
| 2007/0251658 A1 | 11/2007 | Gedevanishvili et al. | |
| 2009/0139534 A1 | 6/2009 | Saoud et al. | |
| 2009/0275466 A1 | 11/2009 | Deevi et al. | |
| 2010/0068120 A1 | 3/2010 | Deevi et al. | |
| 2010/0226846 A1 | 9/2010 | Sundar et al. | |
| 2011/0197902 A1 | 8/2011 | Rabiei et al. | |

| FOREIGN PATENT DOCUMENTS | | |
|---|---|---|
| GB | 685822 | 1/1953 |
| GB | 863287 | 3/1961 |
| GB | 973854 | 10/1964 |
| GB | 1104993 | 3/1968 |
| WO | WO 00/40104 | 7/2000 |

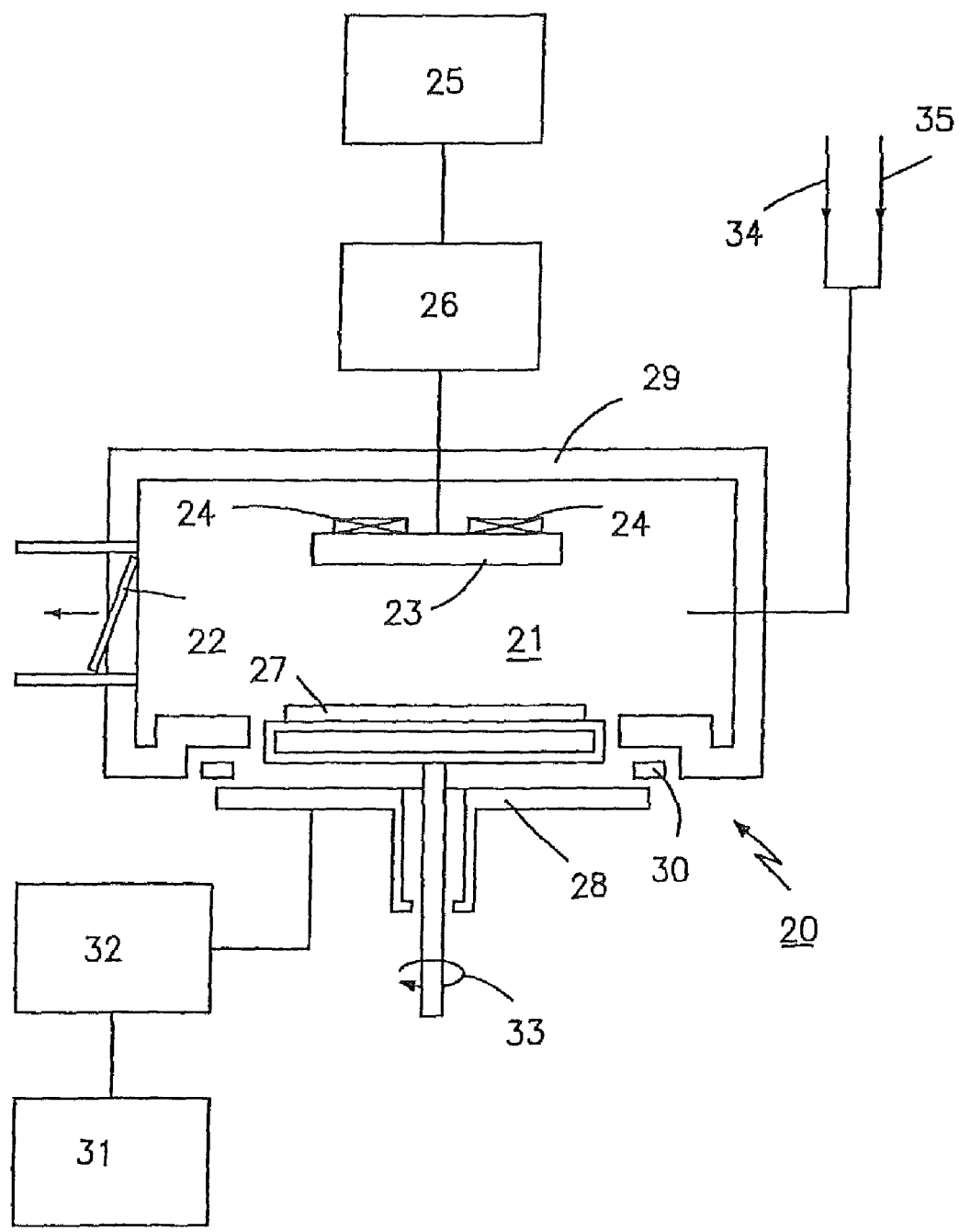

FORMATION AND DEPOSITION OF SPUTTERED NANOSCALE PARTICLES IN CIGARETTE MANUFACTURE

This application is a divisional application of U.S. application Ser. No. 10/972,205 entitled FORMATION AND DEPOSITION OF SPUTTERED NANOSCALE PARTICLES IN CIGARETTE MANUFACTURE, filed on Oct. 25, 2004 now U.S. Pat. No. 8,051,859, which claims priority under 35 U.S.C. §119(e) to U.S. Provisional Application No. 60/514,553, filed Oct. 27, 2003, the entire content of each is hereby incorporated by reference.

BACKGROUND

A variety of gaseous species may be contained in cigarette smoke, such as polynuclear aromatic hydrocarbons (PAHs), heterocyclic compounds, hydrogen cyanide (HCN), nitric oxides ($NO_x$) and carbon monoxide (CO). Conventional techniques, such as normal dilution, filtration, or selective filtration are not completely satisfactory for reducing such constituents in mainstream cigarette smoke.

Despite the developments to date, there is interest in improved and more efficient methods and compositions for reducing the amount of carbon monoxide in the mainstream smoke of a cigarette during smoking. Preferably, it should be possible to catalyze and/or oxidize carbon monoxide not only in the filter region of the cigarette but also along the entire length of the cigarette during smoking.

SUMMARY

A preferred embodiment relates to a method that uses physical vapor deposition to deposit nanoscale particles on a substrate. The substrate may comprise tobacco cut filler, cigarette paper and/or cigarette filter material. The method comprises the steps of (i) supporting the substrate in a chamber having a target; (ii) bombarding the target with energetic ions to form nanoscale particles; and (iii) depositing the nanoscale particles on the substrate.

A further embodiment relates to a method of making a cigarette, comprising the steps of (i) depositing nanoscale particles directly on at least one of tobacco cut filler and cigarette paper; (ii) providing the tobacco cut filler to a cigarette making machine to form a tobacco column; and (iii) placing the cigarette paper around the tobacco rod to form a tobacco rod of a cigarette, wherein the nanoscale particles are deposited by physical vapor deposition.

According to yet a further embodiment, tobacco cut filler comprises nanoscale particles wherein the nanoscale particles are formed and deposited directly on the tobacco cut filler by physical vapor deposition. In a still further embodiment, a cigarette comprises tobacco cut filler and cigarette paper, wherein at least one of the cut filler and cigarette paper comprises nanoscale particles formed and deposited directly on the at least one of tobacco cut filler and cigarette paper by physical vapor deposition.

Preferably the nanoscale particles are capable of acting as an oxidant for the conversion of carbon monoxide to carbon dioxide and/or as a catalyst for the conversion of carbon monoxide to carbon dioxide. The nanoscale particles can be deposited in an amount effective to reduce the ratio in mainstream smoke of carbon monoxide to total particulate matter by at least 10%. Preferably, the nanoscale particles comprise less than about 10% by weight of the substrate.

The nanoscale particles may comprise B, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt, Au and mixtures thereof. Thus, the nanoscale particles may comprise a metal or a metal oxide such as iron oxide. The nanoscale particles may be crystalline or amorphous. Preferably the nanoscale particles have an average particle size of less than about 50 nm, more preferably less than about 10 nm.

According to a preferred embodiment, the chamber is a vacuum chamber. The physical vapor deposition can be carried out in an inert atmosphere such as an argon atmosphere, or the physical vapor deposition can carried out in an atmosphere comprising a reactive gas such as an atmosphere comprising hydrogen, air, oxygen, water vapor or nitrogen.

The physical vapor deposition can be carried out at a pressure of greater than about $1 \times 10^{-4}$ Torr such as a pressure of about atmospheric pressure. The temperature of the substrate during the deposition can be from about −196° C. to 100° C., preferably from about 25° C. to 100° C. The temperature of the substrate can be lower by flowing liquid nitrogen at the base of the support material. Preferably the substrate is supported at a distance of from about 2 to 20 cm from the target.

The physical vapor deposition may comprise laser ablation or sputtering such as radio frequency sputtering or magnetron sputtering. According to a preferred embodiment, the physical vapor deposition comprises radio frequency sputtering in a noble gas plasma.

BRIEF DESCRIPTION OF THE DRAWINGS

FIG. 1 is an illustration of a sputter deposition apparatus.

DETAILED DESCRIPTION OF PREFERRED EMBODIMENTS

The following describes methods of forming and depositing nanoscale particles directly on substrates such as tobacco cut filler, cigarette paper and/or cigarette filter materials. Nanoscale particles are formed and deposited on the substrates by physical vapor deposition (PVD). The method comprises the steps of (i) supporting the substrate in a chamber having a target; (ii) bombarding the target with energetic ions to form nanoscale particles; and (iii) depositing the nanoscale particles on the substrate.

A further embodiment relates to a method of making a cigarette, comprising the steps of (i) depositing nanoscale particles directly on at least one of tobacco cut filler and cigarette paper; (ii) providing the tobacco cut filler to a cigarette making machine to form a tobacco column; and (iii) placing the cigarette paper around the tobacco column to form a tobacco rod of a cigarette, wherein the nanoscale particles are deposited by physical vapor deposition.

According to yet a further embodiment, tobacco cut filler comprises nanoscale particles wherein the nanoscale particles are formed and deposited directly on the tobacco cut filler by physical vapor deposition. In a still further embodiment, a cigarette comprises tobacco cut filler and cigarette paper, wherein at least one of the cut filler and cigarette paper comprises nanoscale particles formed and deposited directly on the at least one of tobacco cut filler and cigarette paper by physical vapor deposition.

The nanoscale particles, which are capable of acting as an oxidant for the conversion of carbon monoxide to carbon dioxide and/or as a catalyst for the conversion of carbon monoxide to carbon dioxide, can reduce the amount of carbon monoxide in mainstream smoke during smoking.

Physical vapor deposition includes sputter deposition and laser ablation of a target material. Sputter deposition is a preferred method. With PVD processes, material from a source (or target) is removed from the target by physical erosion by ion bombardment and deposited on a surface of a substrate. The target is formed of (or coated with) a consumable material to be removed and deposited, i.e., target material.

Sputtering is conventionally implemented by creating a glow discharge plasma over the surface of the target material in a controlled pressure gas atmosphere. Energetic ions from the sputtering gas, usually a chemically inert noble gas such as argon, are accelerated by an electric field to bombard and eject atoms from the surface of the target material. By energetic ions is meant ions having sufficient energy to cause sputtering of the target material.

If the density of the ejected atoms is sufficiently low, and their relative velocities sufficiently high, atoms from the target material travel through the gas until they impact the surface of the substrate where they can coalesce into nanoscale particles. If the density of the ejected atoms is sufficiently high, and their relative velocities sufficiently small, individual atoms from the target can aggregate in the gas phase into nanoscale particles, which can then deposit on the substrate.

Without wishing to be bound by theory, at a sputtering pressure lower than about $10^{-4}$ Torr the mean free path of sputtered species is sufficiently long that sputter species arrive at the substrate without undergoing many gas phase collisions. Thus, at lower pressures, sputtered material can deposit on the substrate as individual species, which may diffuse and coalesce with each other to form nanoscale particles after alighting on the substrate surface. At a higher pressures, such as pressures above about $10^{-4}$ Torr, the collision frequency in the gas phase of sputtered species is significantly higher and nucleation and growth of the sputtered species to form nanoscale particles can occur in the gas phase before alighting on the substrate surface. Thus, at higher pressures, sputtered material can form nanoscale particles in the gas phase, which can deposit on the substrate as discrete nanoscale particles.

There are several different types of apparatus that can be used to generate a glow discharge plasma for sputtering. In a DC diode system, there are two electrodes. A positively charged anode supports the substrate to be coated and a negatively charged cathode comprises the target material. In the DC diode system, sputtering of the target is achieved by applying a DC potential across the two electrodes.

In a radio-frequency (RF) sputtering system, an AC voltage (rather than a DC voltage) is applied to the electrodes. Advantageously, an RF sputtering system can be used to sputter dielectric materials or materials that form an insulating layer such as a native oxide. In both DC and RF sputtering, most secondary electrons emitted from the target do not cause ionization events with the sputter gas but instead are collected at the anode. Because many electrons pass through the discharge region without creating ions, the sputtering rate of the target is lower than if more electrons were involved in ionizing collisions.

One known way to improve the efficiency of glow discharge sputtering is to use magnetic fields to confine electrons to the glow region in the vicinity of the cathode/target surface. This process is termed magnetron sputtering. The addition of such magnetic fields increases the rate of ionization. In magnetron sputtering systems, deposition rates greater than those achieved with DC and RF sputtering systems can be achieved by using magnetic fields to confine the electrons near the target surface.

A method of depositing nanoscale particles via sputtering is provided in conjunction with the exemplary sputtering apparatus depicted in FIG. 1. Apparatus 20 includes a sputtering chamber 21 having an optional throttle valve 22 that separates the chamber 21 from an optional vacuum pump (not shown). A pressed powder target 23 such as an iron oxide target is mounted in chamber 21. Optional magnets 24 are located on the backside of target 23 to enhance plasma density during sputtering. The sputtering target 23 is electrically isolated from the housing 29 and electrically connected to a RF power supply 25 through an impedance matching device 26. Substrates 27, such as tobacco cut filler, cigarette paper or tobacco filter material, are mounted on a substrate holder 28, which is electrically isolated from the housing 29 by a dielectric spacer 30. The housing 29 is maintained at a selected temperature such as room temperature. The substrate holder 28 can be RF biased for plasma cleaning using an RF power supply 31 connected through an impedance matching device 32. The substrate holder 28 is also provided with rotation capability 33.

Referring still to FIG. 1, the reactor chamber 21 contains conduits 34 and 35 for introducing various gases. For example, argon could be introduced through conduit 34 and, optionally, oxygen through conduit 35. Gases are introduced into the chamber by first passing them through separate flow controllers to provide a total pressure of argon and oxygen in the chamber of greater than about $10^{-4}$ Torr.

In order to obtain a reactive sputtering plasma of the gas mixture, an RF power density of from about 0.01 to 10 W/cm$^2$ can be applied to the target 23 throughout the deposition process. Pressure in the chamber during physical vapor deposition can be between about $10^{-4}$ Torr to 760 Torr. The substrate temperature can be between about −196° C. and 100° C. A temperature gradient can be maintained between the target and the substrate during the deposition by flowing a cooling liquid such as chilled water or liquid nitrogen through the substrate support.

Nanoscale particles may be formed and deposited on a substrate using an ablation process, wherein a suitable high energy source such as a laser is aimed at a target under conditions sufficient to release individual particles from the target. Lasers include, but are not limited to, Nd-YAG lasers, ion lasers, diode array lasers and pulsed excimer lasers. Advantageously, ablation such as laser ablation can be performed at or above atmospheric pressure without the need for vacuum equipment. Thus, the nanoscale particles may be simultaneously formed and deposited on a substrate that is maintained at ambient temperature and atmospheric pressure during the deposition process.

An apparatus for ablative processing includes a chamber in which a target material is placed. An external energy source, such as a pulsed excimer laser, enters the chamber through a window, preferably quartz, and interacts with target. Alternatively, the energy source can be internal, i.e., positioned inside the chamber.

In an ablative process, a region of the target absorbs incident energy from the energy source. This absorption and subsequent heating of the target causes target material to ablate from the surface of the target into a plume of atomic and nanometer-scale particles. The substrate material may be supported on a substrate holder or, because a laser ablation process can be carried out at atmospheric pressure, passed through the coating chamber on a moving substrate holder such as a conveyor belt operated continuously or discontinuously to provide a desired amount of deposited nanoscale particles on the substrate material.

As is well known in the art, energetic ions can also be provided in the form of an ion beam from an accelerator, ion separator or an ion gun. An ion beam may comprise inert gas ions such as neon, argon, krypton or xenon. Argon is preferred because is can provide a good sputter yield and is relatively inexpensive. The energy of the bombarding inert gas ion bean can be varied, but should be chosen to provide a sufficient sputtering yield. The ion beam can be scanned across the surface of the target material in order to improve the uniformity of target wear.

The introduction of reactive gases into the chamber during the deposition process allows material sputtered or ablated from the target to combine with such gases to obtain compound nanoscale particles. Thus, in reactive PVD the sputtering gas includes a small proportion of a reactive gas, such as hydrogen, air, oxygen, water vapor, nitrogen, etc., which reacts with the atoms of the target material to form metal compound particles such as hydride, oxide and/or nitride nanoscale particles.

Compound nanoscale particles can also be deposited on a substrate via the sputtering of the corresponding compound (e.g., hydride, oxide or nitride) target. For example, iron oxide nanoscale particles may be deposited by sputtering an iron target in the presence of oxygen and/or by sputtering an iron oxide target.

The microstructure of the nanoscale particles can be controlled using physical vapor deposition. Density, phase distribution and the extent and morphology of crystalline (versus amorphous) phases can be controlled by varying, for example, the deposition pressure, ion energy and substrate temperature.

The nanoscale particles can comprise B, Al, Si, Ti, V, Cr, Fe, Co, Ni, Cu, Zn, Ge, Y, Zr, Nb, Mo, Ru, Rh, Pd, Ag, Sn, Ce, Hf, Ta, W, Re, Os, Ir, Pt, Au, as well as hydrides, oxides, nitrides and mixtures thereof.

As discussed above, with sputtering the substrate is typically placed proximate to the cathode. With sputtering and ablative processes, the substrate is placed within sputtering proximity of the target, such that it is in the path of the sputtered or ablated target atoms and the target material is deposited on the surface of the substrate.

By regulating the deposition parameters, including background gas, pressure, substrate temperature and time, it is possible to prepare cigarette components such as tobacco cut filler, cigarette paper and/or cigarette filter material that comprise a loading and distribution of nanoscale particles thereon effective to reduce the amount of carbon monoxide in mainstream smoke.

Preferably, the nanoscale particles are deposited in an amount effective to reduce the ratio in mainstream smoke of carbon monoxide to total particulate matter (e.g., tar) by at least 10%, more preferably by at least 25%. Preferably, the nanoscale particles comprise less than about 10% by weight of the substrate, more preferably less than about 5% by weight of the substrate.

The PVD process is stopped when there is still exposed substrate surface. That is, the PVD method does not build up a continuous layer but rather forms clusters of discrete nanoscale particles that are distributed over the substrate surface. During the process, new clusters form and existing clusters grow.

Advantageously, physical vapor deposition allows for dry, solvent-free, simultaneous formation and deposition of nanoscale particles under sterile conditions.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e. the amount of smoke issuing or drawn from the mouth end of a cigarette during smoking of the cigarette.

In addition to the constituents in the tobacco, the temperature and the oxygen concentration are factors affecting the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$, are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the nanoscale particles can target the various reactions that occur in different regions of the cigarette during smoking.

First, the combustion zone is the burning zone of the cigarette produced during smoking of the cigarette, usually at the lighted end of the cigarette. The temperature in the combustion zone ranges from about 700° C. to about 95° C., and the heating rate can be as high as 500° C./second. Because oxygen is being consumed in the combustion of tobacco to produce carbon monoxide, carbon dioxide, water vapor and various organic compounds, the concentration of oxygen is low in the combustion zone. The low oxygen concentrations coupled with the high temperature leads to the reduction of carbon dioxide to carbon monoxide by the carbonized tobacco. In this region, the nanoscale particles can convert carbon monoxide to carbon dioxide via both catalysis and oxidation mechanism. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the nanoscale particles may act as a catalyst for the oxidation of carbon monoxide to carbon dioxide. The catalytic reaction begins at 150° C. and reaches maximum activity around 300° C.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level.

According to a preferred method, the nanoscale particles are formed in situ by sputtering and are deposited directly on tobacco cut filler. According to a further embodiment, the nanoscale particles can be deposited on paper and/or filter materials used to form a cigarette. Nanoscale particles are a novel class of materials whose distinguishing feature is that their average diameter, particle or other structural domain size is below 500 nanometers. The nanoscale particles can have an average particle size less than about 100 nm, preferably less than about 50 nm, more preferably less than about 10 nm, and most preferably less than about 7 nm. At this small scale, a variety of confinement effects can significantly change the properties of the material that, in turn, can lead to commercially useful characteristics. For example, nanoscale particles have very high surface area to volume ratios, which makes them attractive for catalytic applications.

During the conversion of CO to $CO_2$, the nanoscale particles may become reduced. For example, nanoscale particles of $Fe_2O_3$, which may deposited on tobacco cut filler, cigarette paper and/or cigarette filter material may be reduced to FeO or Fe during the reaction of CO to $CO_2$.

Iron oxide is a preferred constituent in the nanoscale particles because is has a dual function as a CO catalyst in the presence of oxygen and as a CO oxidant for the direct oxidation of CO in the absence of oxygen. A catalyst that can also be used as an oxidant is especially useful for certain applications, such as within a burning cigarette where the partial pressure of oxygen can be very low.

The nanoscale particles will preferably be distributed throughout the tobacco rod and/or along the cigarette paper or filter portions of a cigarette. By providing the nanoscale particles throughout the tobacco rod and/or along the cigarette paper, it is possible to reduce the amount of carbon monoxide drawn through the cigarette, and particularly at both the combustion region and in the pyrolysis zone.

The nanoscale particles, as described above, may be provided along the length of a tobacco rod or at discrete locations along the length of a tobacco rod. For example, the nanoscale particles can be deposited on loose cut filler tobacco stock or deposited directly on a tobacco column prior to wrapping cigarette paper around the cigarette column. The nanoscale particles may be deposited directly on cigarette paper before or after the cigarette paper is incorporated into a cigarette.

The amount of the nanoscale particles can be selected such that the amount of carbon monoxide in mainstream smoke is reduced during smoking of a cigarette. Preferably, the amount of the nanoscale particles will be a catalytically effective amount, e.g., an amount sufficient to oxidize and/or catalyze at least 10% of the carbon monoxide in mainstream smoke, more preferably at least 25%.

One embodiment provides tobacco cut filler comprising nanoscale particles wherein the nanoscale particles are formed and deposited directly on the tobacco cut filler by physical vapor deposition.

Any suitable tobacco mixture may be used for the cut filler. Examples of suitable types of tobacco materials include flue-cured, Burley, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g. burn additives, combustion modifying agents, coloring agents, binders, etc.) known in the art.

Another embodiment provides a cigarette comprising tobacco cut filler and cigarette paper, wherein at least one of the cut filler and cigarette paper comprises nanoscale particles formed and deposited directly on the at least one of tobacco cut filler and cigarette paper by physical vapor deposition. A further embodiment provides a method of making a cigarette comprising: (i) depositing nanoscale particles directly on at least one of tobacco cut filler and cigarette paper; (ii) providing the tobacco cut filler to a cigarette making machine to form a tobacco column; and (iii) placing the cigarette paper around the tobacco column to form a tobacco rod of a cigarette, wherein the nanoscale particles are deposited by physical vapor deposition.

Techniques for cigarette manufacture are known in the art. Any conventional or modified cigarette making technique may be used to incorporate the nanoscale particles. The resulting cigarettes can be manufactured to any known specifications using standard or modified cigarette making techniques and equipment. Typically, the cut filler composition is optionally combined with other cigarette additives, and provided to a cigarette making machine to produce a tobacco rod, which is then wrapped in cigarette paper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 $mg/cm^3$ to about 300 $mg/cm^3$, and preferably 150 $mg/cm^3$ to about 275 $mg/cm^3$.

While various embodiments have been described, it is to be understood that variations and modifications may be resorted to as will be apparent to those skilled in the art. Such variations and modifications are to be considered within the purview and scope of the claims appended hereto.

All of the above-mentioned references are herein incorporated by reference in their entirety to the same extent as if each individual reference was specifically and individually indicated to be incorporated herein by reference in its entirety.

What is claimed is:

1. A method of making a cigarette, comprising:
   (i) depositing nanoscale particles directly on a substrate selected from the group consisting of tobacco cut filler and cigarette paper;
   (ii) providing the tobacco cut filler to a cigarette making machine to form a tobacco column; and
   (iii) placing the cigarette paper around the tobacco column to form a tobacco rod of a cigarette, wherein the nanoscale particles are deposited by physical vapor deposition.

2. The method of claim 1, wherein the nanoscale particles are capable of acting as an oxidant for the conversion of carbon monoxide to carbon dioxide and/or as a catalyst for the conversion of carbon monoxide to carbon dioxide.

3. The method of claim 1, wherein the nanoscale particles are deposited in an amount effective to reduce the ratio in mainstream tobacco smoke of carbon monoxide to total particulate matter by at least 10%.

4. The method of claim 1, wherein the nanoscale particles comprise less than about 10% by weight of the substrate.

5. The method of claim 1, wherein the nanoscale particles comprise B, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt, Au and mixtures thereof.

6. The method of claim 1, wherein the nanoscale particles comprise a metal and/or metal compound.

7. The method of claim 1, wherein the nanoscale particles comprise iron oxide.

8. The method of claim 1, wherein the nanoscale particles have a crystalline or amorphous structure.

9. The method of claim 1, wherein the nanoscale particles have an average particle size of less than about 50 nm.

10. The method of claim 1, wherein the nanoscale particles have an average particle size of less than about 10 nm.

11. The method of claim 1, wherein the chamber is a vacuum chamber.

12. The method of claim 1, wherein the physical vapor deposition is carried out in an inert atmosphere or in an atmosphere comprising a reactive gas.

13. The method of claim 1, wherein the physical vapor deposition is carried out in an atmosphere comprising argon.

14. The method of claim 12, wherein the reactive gas is selected from the group consisting of hydrogen, air, oxygen, water vapor, nitrogen and mixtures thereof.

15. The method of claim 1, wherein the physical vapor deposition is carried out at a pressure of greater than about $1 \times 10^{-4}$ Torr.

16. The method of claim 1, wherein the physical vapor deposition is carried out at a pressure of about atmospheric pressure.

17. The method of claim 1, wherein the substrate is at a temperature during the deposition of from about −196 EC to 100 EC.

18. The method of claim 1, wherein the substrate is supported at a distance of from about 2 to 20 cm from the target.

19. The method of claim 1, wherein the physical vapor deposition comprises laser ablation or sputtering.

20. The method of claim 1, wherein the physical vapor deposition comprises radio frequency sputtering or magnetron sputtering.

21. The method of claim 1, wherein the physical vapor deposition comprises radio frequency sputtering in a noble gas plasma.

22. Tobacco cut filler comprising nanoscale particles wherein the nanoscale particles are formed and deposited directly on the tobacco cut filler by physical vapor deposition.

23. The tobacco cut filler of claim 22, wherein the nanoscale particles are capable of acting as an oxidant for the conversion of carbon monoxide to carbon dioxide and/or as a catalyst for the conversion of carbon monoxide to carbon dioxide.

24. The tobacco cut filler of claim 22, wherein the nanoscale particles are deposited in an amount effective to reduce the ratio in mainstream tobacco smoke of carbon monoxide to total particulate matter by at least 10%.

25. The tobacco cut filler of claim 22, wherein the nanoscale particles comprise less than about 10% by weight of the tobacco cut filler.

26. The tobacco cut filler of claim 22, wherein the nanoscale particles comprise B, Al, Si, Ti, Fe, Co, Ni, Cu, Zn, Ge, Zr, Nb, Mo, Ru, Rh, Pd, Ag, Sn, Ce, Hf, Ta, W, Re, Os, Ir, Pt, Au and mixtures thereof.

27. The tobacco cut filler of claim 22, wherein the nanoscale particles comprise a metal and/or metal compound.

28. The tobacco cut filler of claim 22, wherein the nanoscale particles comprise iron oxide.

29. The tobacco cut filler of claim 22, wherein the nanoscale particles have a crystalline or amorphous structure.

30. The tobacco cut filler of claim 22, wherein the nanoscale particles have an average particle size of less than about 50 nm.

31. The tobacco cut filler of claim 22, wherein the nanoscale particles have an average particle size of less than about 10 nm.

32. A cigarette comprising tobacco cut filler and cigarette paper, wherein at least one of the cut filler and cigarette paper comprises nanoscale particles formed and deposited directly on the at least one of tobacco cut filler and cigarette paper by physical vapor deposition.

\* \* \* \* \*